US012804003B2

(12) United States Patent
Wu et al.

(10) Patent No.: US 12,804,003 B2
(45) Date of Patent: Nov. 17, 2026

(54) DEEP LEARNING-BASED COMMAND AND CONTROL DETECTION ACROSS MULTIPLE PROTOCOLS AND SESSIONS

(71) Applicant: Palo Alto Networks, Inc., Santa Clara, CA (US)

(72) Inventors: Yuhao Wu, St. Louis, MO (US); Nandini Ramanan, Sunnyvale, CA (US); Lei Xu, Sunnyvale, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 33 days.

(21) Appl. No.: 19/041,190

(22) Filed: Jan. 30, 2025

(65) Prior Publication Data

US 2026/0222430 A1 Jul. 30, 2026

(51) Int. Cl.
*H04L 9/40* (2022.01)

(52) U.S. Cl.
CPC ................................ *H04L 63/1425* (2013.01)

(58) Field of Classification Search
CPC ................................................... H04L 63/1425
See application file for complete search history.

(56) References Cited

U.S. PATENT DOCUMENTS 12,199,997 B1 * 1/2025 Lin ......................... H04L 41/22
2017/0310691 A1 * 10/2017 Vasseur ............... H04L 41/0631
2019/0173848 A1 * 6/2019 Lapidous ............ H04L 63/0428
2020/0219005 A1 * 7/2020 Valdez ................... G06N 20/20
2022/0210171 A1 * 6/2022 Grossman ........... H04L 63/1425

OTHER PUBLICATIONS

Li, et al., "Deep Model Fusion: A Survey", arXiv:2309.15698v1 [cs.LG] Sep. 27, 2023, 46 pages.
Liu, et al., "Understanding Uncertainty Sampling", arXiv:2307.02719v3 [cs.LG] Jul. 20, 2023, 53 pages.
Xinpeng, et al., "ACTOR: Active Learning with Annotator-specific Classification Heads to Embrace Human Label Variation", In Proceedings of the 2023 Conference on Empirical Methods in Natural Language Processing, 7 pages, Singapore. Association for Computational Linguistics.

* cited by examiner

*Primary Examiner* — Amir Mehrmanesh
*Assistant Examiner* — Thomas A Gyorfi
(74) *Attorney, Agent, or Firm* — Gilliam IP PLLC

(57) ABSTRACT

A C2 detection system includes protocol-specific C2 classifiers and a protocol-agnostic C2 classifier. Network traffic is correlated by shared attributes within a time window, grouping PDUs across protocols into a grouping that likely corresponds to a common network entity. Each PDU payload representation is processed by a corresponding one of the protocol-specific C2 classifiers to generate a prediction of whether the payload is malicious or benign. The C2 detection system applies a suspicious criterion to the predictions to focus on payloads that have been classified as malicious and those with low confidence benign predictions. The PDU payloads that are deemed suspicious are combined with their logits and the combinations fused together to yield a cross-protocol user session level feature vector as input for the protocol-agnostic C2 classifier. With the fused input, the protocol-agnostic C2 classifier classifies the user session as benign or malicious with respect to a C2 attack.

20 Claims, 6 Drawing Sheets

DEEP LEARNING-BASED COMMAND AND CONTROL DETECTION ACROSS MULTIPLE PROTOCOLS AND SESSIONS

BACKGROUND

The disclosure generally relates to machine learning and cybersecurity (e.g., CPC subclass G06N and CPC subclass G06F 16).

The National Institute of Standards and Technology (NIST) Special Publication 1800-30B provided a threat taxonomy that included a description of the command and control threat. It stated "Command and control attacks may begin with deployment of malware. Malware may allow a system to be operated remotely by unauthorized entities. Should a system fall victim to a command-and-control attack, that system may then be used as a pivot point to attack other components, either within the organization's infrastructure or as a point where attacks may be launched against other organizations."

The MITRE ATT&CK® Matrix for Enterprise currently identifies 18 command and control (C2 or C&C) techniques. The techniques utilize different communication protocols to establish communications, infect a targeted machine(s), and carry out any of a variety of malicious purposes, such as data exfiltration, malware deployment, and botnet formation.

BRIEF DESCRIPTION OF THE DRAWINGS

Embodiments of the disclosure may be better understood by referencing the accompanying drawings.

DESCRIPTION

Figure 1:
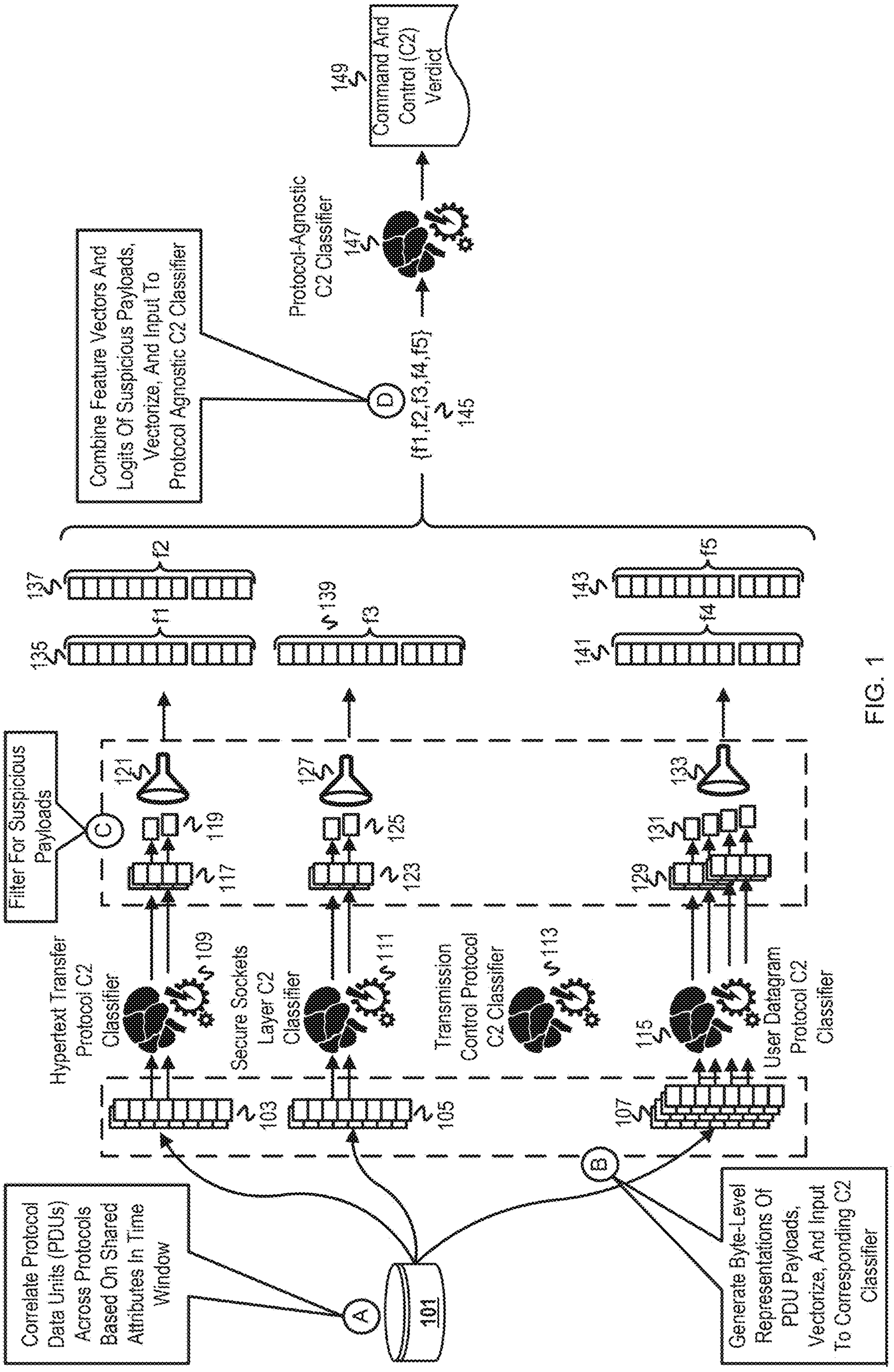
FIG. 1 is a diagram of a user session level C2 detection system that includes multiple protocol-specific C2 classifiers and a protocol-agnostic C2 classifier.

The description that follows includes example systems, methods, techniques, and program flows to aid in understanding the disclosure and not to limit claim scope. Well-known instruction instances, protocols, structures, and techniques have not been shown in detail for conciseness.

Terminology

The description refers to a protocol data unit (PDU). This term is used to refer to a unit of data communicated according to a communication protocol. A PDU includes at least a header and payload or an encapsulation and payload. A PDU may be a frame, packet, datagram, message, etc. depending upon the corresponding communication protocol.

The description uses the term "user session" to refer to a communication session with a target device/system. A user session involves transmission of PDUs according to multiple communication protocols across different layers of a network stack (e.g., transmission control protocol/Internet Protocol (TCP/IP) at layer 3/4, Hypertext Transfer Protocol (HTTP) session at layer 7, etc.). Some of these protocols are connectionless (e.g., user datagram protocol (UDP) and do not manage sessions while others do. Regardless of the variation in protocols, a user session will involve communications between one or more processes/systems of a user and the target system. While the term "user session" indicates a user is involved, user involvement can be the initiation of processes or "bots" that communicate with the target system.

The description uses the term "logit" as used in the context of deep learning. In deep learning, "logits" refers to the unnormalized ("raw") predictions/output from a final layer of a neural network. Each neuron of the final layer outputs a logit that can be any real number within practical constraints of hardware. In terms of a classifier, a logit is the real number prediction that a corresponding class is present. A classifier will typically include a transform function (e.g., SoftMax for multi-class prediction) that maps each logit to a probability in the range [0,1], which is sometimes referred to as the score.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Conventional signature-based or rule-based systems for C2 detection cannot keep pace with the dynamic nature of C2 techniques and the increasing use of encryption and obfuscation for C2 attacks. Conventional model-based systems for C2 detection rely on protocol-specific models and manual feature extraction which depends on expertise in protocol intricacies. These suffer from scaling challenges. These conventional C2 detection systems focus on analyzing individual packets or flows of an individual communication protocol.

A C2 detection system has been created that detects a C2 attack based on cross-protocol network traffic at a user session level. The C2 detection system architecture includes protocol-specific C2 classifiers and a protocol-agnostic C2 classifier. Network traffic is correlated by shared attributes within a time window, which groups PDUs across protocols into a grouping that likely corresponds to the same user session. The system extracts payloads and generates representations of the payloads. Each PDU payload representation is processed by a corresponding one of the protocol-specific C2 classifiers to generate a prediction of whether the payload is malicious or benign. The C2 detection system applies a suspicious criterion to the predictions to focus on payloads that have been classified as malicious and those with low confidence benign predictions. The PDU payload representations that are deemed suspicious are combined with their logits and the combinations fused together to yield a cross-protocol user session level feature vector as input for the protocol-agnostic C2 classifier. With the fused input, the protocol-agnostic C2 classifier classifies the user session as benign or malicious with respect to a C2 attack.

Example Illustrations

FIG. 1 is a diagram of a user session level C2 detection system that includes multiple protocol-specific C2 classifiers and a protocol-agnostic C2 classifier. The protocol-specific C2 classifiers include a HTTP C2 classifier 109, a secure sockets layer (SSL) C2 classifier 111, a TCP C2 classifier 113, and a UDP C2 classifier 115. Each of these C2 classifiers 109, 111, 113, 115 have been trained to classify payloads of PDUs of the corresponding communication protocol as malicious or benign for C2 detection. The classifications by the protocol-specific C2 classifiers then inform the session level classification by a protocol-agnostic C2 classifier 147.

FIG. 1 is annotated with a series of letters A-D representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the user session level C2 detection system correlates PDUs across protocols based on shared attributes in a time window. Network traffic data, such as pcap (packet capture) files, are collected into a repository 101. The repository 101 can be a data lake, data warehouse, blob, or other type of data repository. Points of collection can be firewalls, routers, software defined wide area network (SD-WAN) network elements, etc. These collection points capture network traffic data of different layers of a network stack. The network traffic can be HTTP messages, TCP/IP packets, UDP datagrams, etc. Some additional pre-processing may be performed to assemble higher layer PDUs from payloads of lower layer PDUs (e.g., assembling application layer messages from transport layer payloads). The user session level C2 detection system analyzes the network traffic data to correlate PDUs indicated in the network traffic data within a defined time window (e.g., 10 minutes) that share an attribute. For instance, the user session level C2 detection system scans across network traffic data in a sliding 10 minute window for PDUs that indicate a same destination network address or domain.

At stage B, the user session level C2 detection system generates byte-level representations of PDU payloads and inputs them to the appropriate protocol-specific C2 classifier. After generating byte-level encodings of the payloads of the PDUs, the user session level C2 detection system vectorizes the byte-level encodings to generate the byte-level representations of the PDU payloads. This generates HTTP feature vectors 103, SSL feature vectors 105, and UDP feature vectors 107. The user session level C2 detection system then feeds the feature vectors into the protocol-specific classifiers. The user session level C2 detection system invokes the HTTP C2 classifier 109 on each feature vector of the HTTP feature vectors 103 and obtains logits 117 and classifications 119. For each feature vector of the SSL feature vectors 105, the user session level C2 detection system invokes the SSL C2 classifier 111 and obtains logits 123 and classifications 125. For each feature vector of the UDP feature vectors 107, the user session level C2 detection system invokes the UDP C2 classifier 115 and obtains logits 129 and classifications 131. In this illustration, the correlated network traffic data did not include TCP/IP packets. Thus, the TCP C2 classifier 113 is not invoked for this user session.

At stage C, the user session level C2 detection system filters for suspicious payloads. A criterion ("suspicious criterion") is defined for indicating a "suspicious payload" based on a probability or confidence threshold $\tau$. The suspicious criterion establishes what low and high or sufficient confidence is for a classification. The classifications within and across the different protocols can vary. For example, the UDP C2 classifier 115 may classify some but not all of the UDP feature vectors 107 as malicious. Perhaps, none of the SSL feature vectors 105 are classified as malicious by the SSL C2 classifier 111. A feature vector classified as malicious will not be filtered out. Feature vectors with low confidence benign classifications will not be filtered out. FIG. 1 depicts filters 121, 127, 133 corresponding to an implementation that allows for different suspicious payload criterion to be defined for each protocol specific classifier, although this is not necessary. The user session level C2 detection system filters out those payloads or feature vectors with high confidence benign classifications.

At stage D, the user session level C2 detection system combines protocol-specific feature vectors and logits of suspicious payloads and inputs the combined/fused feature vectors and logits to the protocol-agnostic C2 classifier 147. The classifier 147 is referred to as "protocol agnostic" since it does not require knowledge of the protocols underlying the fused input provided to the classifier. The protocol-agnostic C2 classifier 147 is a neural network-based model, such as a convolutional neural network, with a multi-head attention mechanism. The protocol-agnostic C2 classifier 147 was trained on user session level representations consisting of heterogeneous contributions from different protocols. Protocols represented in the fused input can vary across runs of the classifier 147. In this example, the filtered output from the HTTP C2 classifier 109 is a byte-level payload representation and logits combination 135 ("f1") and a byte-level payload representation and logits combination 137 ("f2"). The filtered output from the SSL C2 classifier 111 is a byte-level payload representation and logits combination 139 ("f3"). The filtered output from the UDP C2 classifier 115 is a byte-level payload representation and logits combination 141 ("f4") and a byte-level payload representation and logits combination 143 ("f5"). The user session level C2 detection system combines or concatenates the combinations 135, 137, 139, 141, 143 into a feature vector 145 depicted in FIG. 1 as {f1, f2, f3, f4, f5}. The user session level C2 detection system inputs the feature vector 145 into the protocol-agnostic C2 classifier 147 to obtain a C2 verdict 149. The security verdict can be the classification/probability output from the protocol-agnostic C2 classifier 147 or an indicator of malicious or benign (e.g., flag) based on the classification. A security action can then be taken based on the verdict (e.g., blocking network traffic, generating an alert, tracing a connection, etc.).

Figure 2:
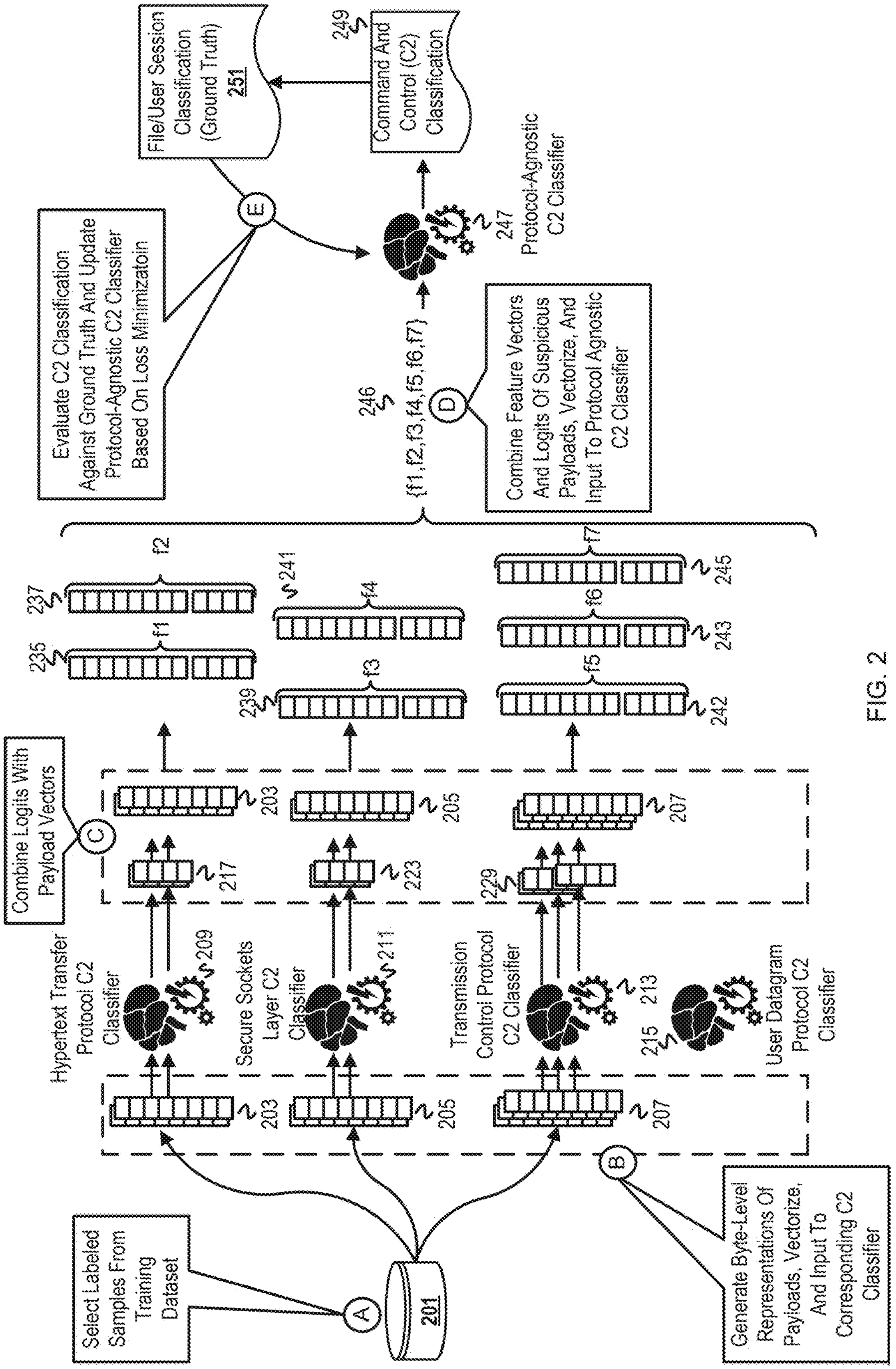
FIG. 2 is a diagram of a single iteration of training a fused model that includes protocol specific C2 classifiers and a protocol-agnostic C2 classifier.

FIG. 2 is a diagram of a single iteration of training a fused model that includes protocol-specific C2 classifiers and a protocol-agnostic C2 classifier. This illustration presumes that the protocol-specific C2 classifiers have already been trained. The already trained protocol-specific C2 classifiers include a HTTP C2 classifier 209, an SSL C2 classifier 211, a TCP C2 classifier 213, and a UDP C2 classifier 215. The fused model can be considered as comprising multiple pipelines-a pipeline for each protocol that includes pre-processing and model invocation for classification. These individual pipelines merge into a pipeline for a protocol-agnostic C2 classifier 247. The pipeline for the protocol-agnostic C2 classifier 247 includes pre-processing (fusing the byte-level payload representations and logits) of classifier specific outputs and their corresponding byte-level payload representations, invocation of the protocol-agnostic C2 classifier 247, and loss minimization based on a user session label (e.g., file label) and a C2 classification 249. Operations similar to those already described in FIG. 1 are described in a manner to reduce repetition.

FIG. 2 is annotated with a series of letters A-E representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the user session level C2 detection system selects labeled samples of network traffic data from a training dataset in a repository 201. Presumably, the training dataset is already organized by groupings of PDUs with shared attributes within defined time windows. If not, then the user session level C2 detection system correlates PDUs across protocols based on shared attributes in a time window as in FIG. 1. The grouping will correspond to a file that has been classified as malicious or benign relating to a C2 attack. Thus, the grouping is labeled with that file classification.

At stage B, the user session level C2 detection system generates byte-level encodings of PDU payloads, vectorizes the encodings, and inputs them to the appropriate protocol-specific C2 classifier. This is similar to the stage B in FIG. 1. This generates HTTP feature vectors 203, SSL feature vectors 205, and TCP feature vectors 207. The user session level C2 detection system invokes the HTTP C2 classifier 209 on each feature vector of the HTTP feature vectors 203 and obtains logits 217. For each feature vector of the SSL feature vectors 205, the user session level C2 detection system invokes the SSL C2 classifier 211 and obtains logits 223. For each feature vector of the TCP feature vectors 207, the user session level C2 detection system invokes the TCP C2 classifier 213 and obtains logits 229.

At stage C, the user session level C2 detection system combines the logits with the PDU payload vectors. The user session level C2 detection system combines each of the logits 217 with a respective one of the HTTP payload vectors 203 to generate byte-level payload representation and logits combination 235 ("f1") and combination 237 ("f2"). The user session level C2 detection system combines each of the logits 223 with a respective one of the SSL payload vectors 205 to generate byte-level payload representation and logits combination 239 ("f3") and combination 241 ("f4"). The user session level C2 detection system combines each of the logits 229 with a respective one of the TCP payload vectors 207 to generate byte-level payload representation and logits combination 242 ("f5"), combination 243 ("f6"), and combination 245 ("f7").

At stage D, the user session level C2 detection system fuses the combinations of protocol-specific feature vectors and logits and inputs the fused combinations to the protocol-agnostic C2 classifier 247. The user session level C2 detection system concatenates the combinations 235, 237, 239, 241, 242, 243, 245 into a feature vector 246 depicted in FIG. 2 as {f1, f2, f3, f4, f5, f6, f7}. The user session level C2 detection system inputs the feature vector 246 into the protocol-agnostic C2 classifier 247 to obtain a C2 classification 249.

At stage E, the user session level C2 detection system evaluates the C2 classification 249 against ground truth, which is a file/user session classification 251. The user session level C2 detection system performs loss minimization based on the C2 classification 249 and the file/user session classification 251. The C2 detection system then updates the classifier 247 based on the loss minimization.

Figure 3:
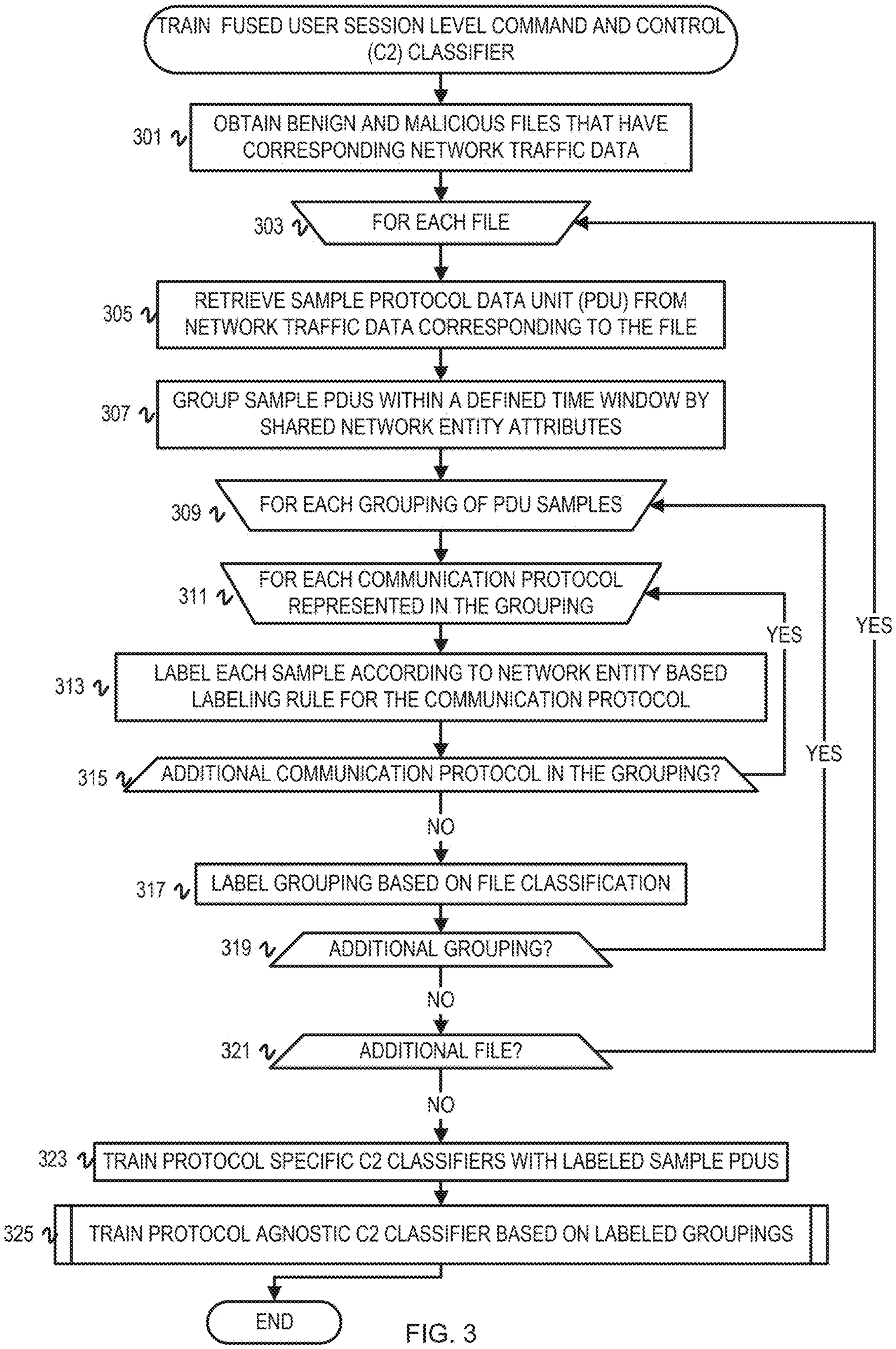
FIG. 3 is a flowchart of example operations for training a fused user session level C2 classifier.
Figure 4:
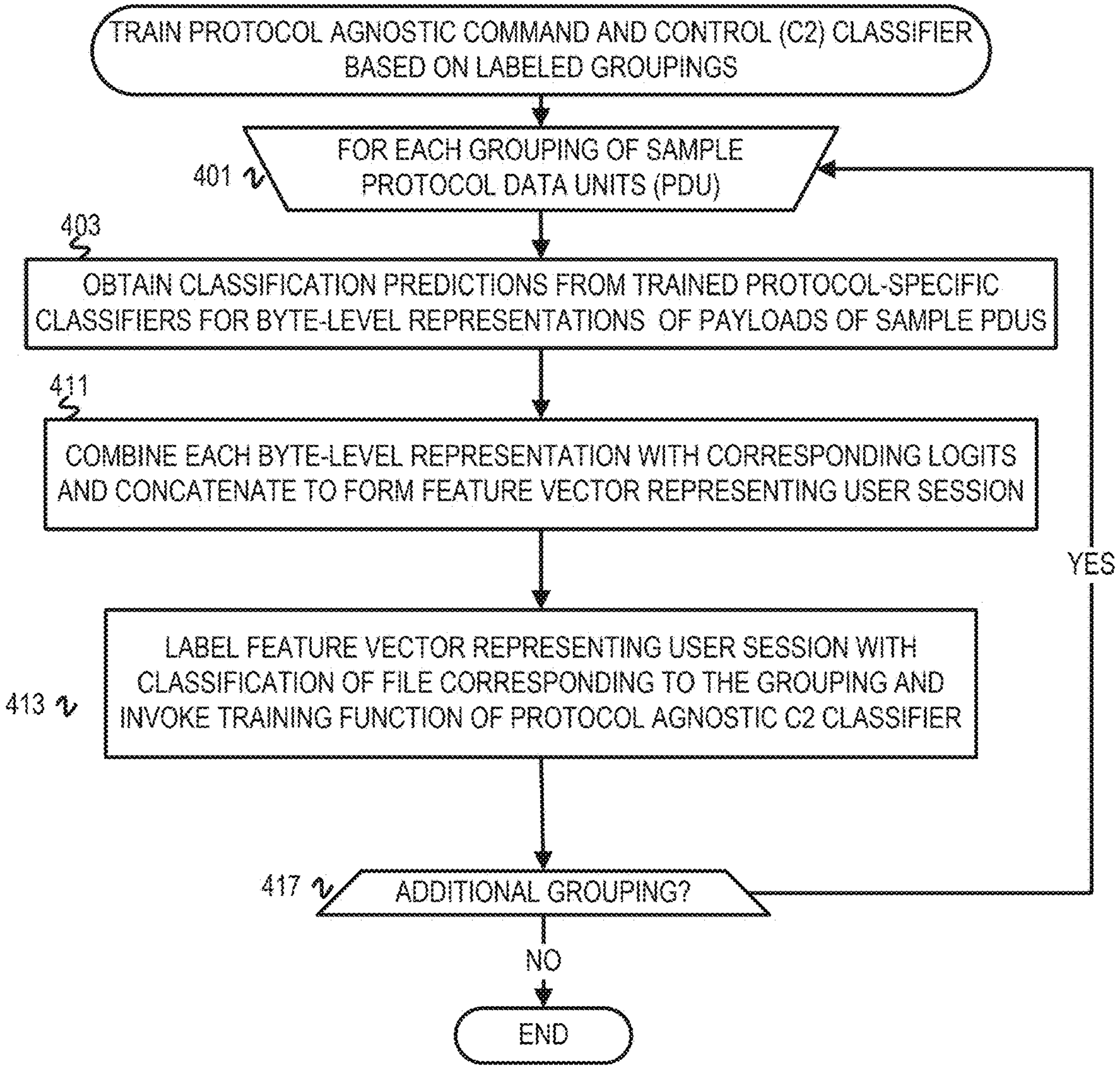
FIG. 4 is a flowchart of example operations for training a protocol-agnostic C2 classifier based on labeled groupings.
Figure 5:
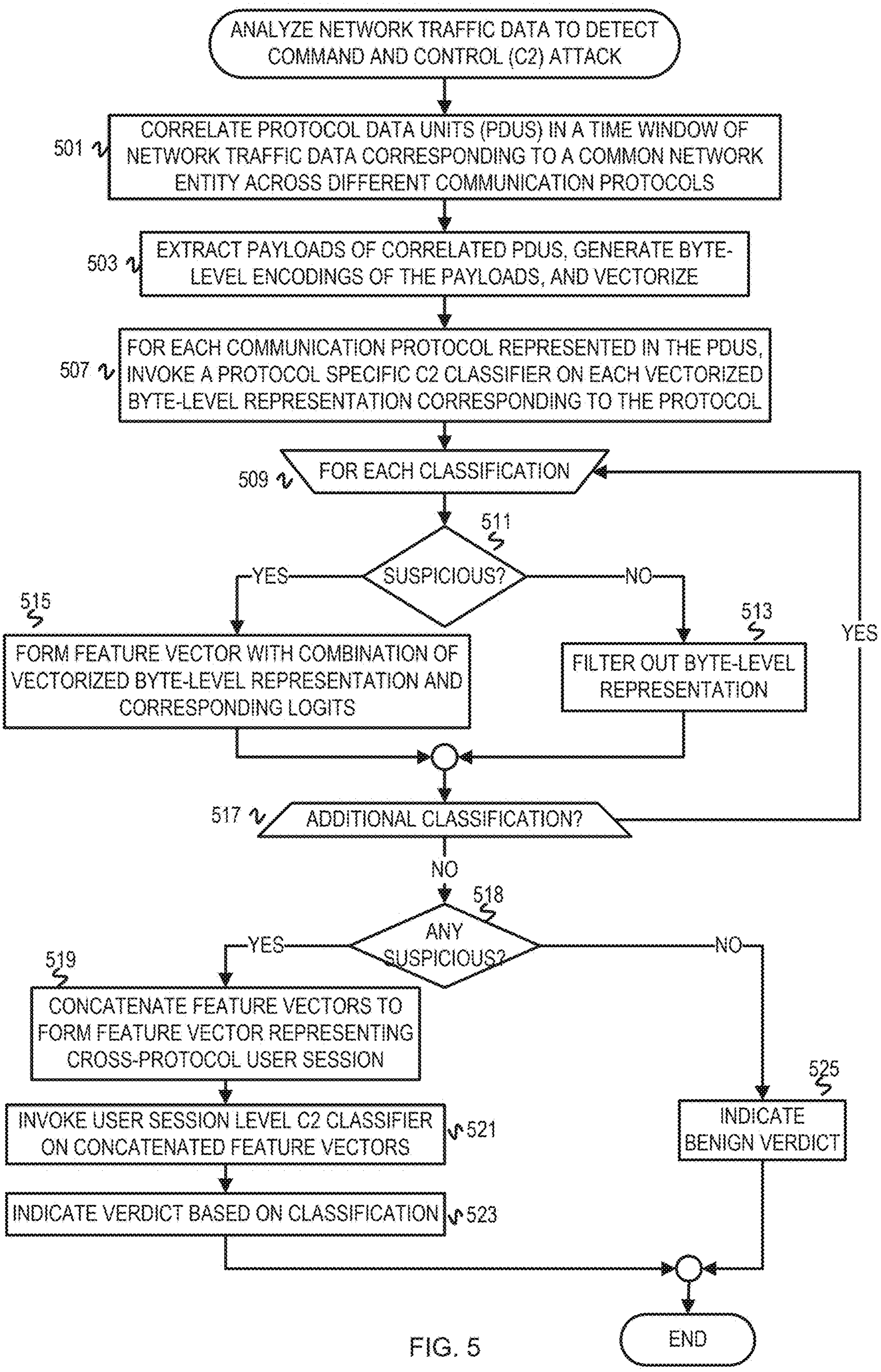
FIG. 5 is a flowchart of example operations for analyzing network traffic data to detect a C2 attack.

While FIGS. 1-2 provide example illustrations to aid in understanding the disclosed technology, the following flowcharts elaborate on some operations without being tethered to a specific scenario. FIGS. 3-4 are flowcharts that relate to training a fused model that includes a protocol-agnostic C2 classifier and protocol-specific classifiers. FIG. 5 is an example flowchart for C2 detection with the trained fused model. The example operations of FIGS. 3-4 are described with reference to a trainer. The example operations of FIG. 5 are described with reference to a user session level C2 detection system for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for training a fused user session level C2 classifier. The training relies on classification of files used in C2 attacks and benign files as ground truth for user session level classification regardless of constituent protocols because the file is an entity that represents the user session level across protocols. The training also relies on classification of network entities expressed as attributes of PDUs. Although these example operations use the same training dataset to train the protocol-specific C2 classifiers and the protocol-agnostic C2 classifiers, this is not necessary. Embodiments can use one training dataset for training the protocol-specific C2 classifiers and another training dataset for the protocol-agnostic C2 classifier after the protocol-specific C2 classifiers have been trained.

At block 301, a trainer obtains benign and malicious files that have corresponding network traffic data. The malicious files are associated with detected C2 attacks. A training dataset can indicate benign and malicious files and associated network traffic data. Alternatively, the training data can include benign and malicious files and network traffic data not yet associated with the files.

At block 303, the trainer begins operations to organize PDU samples by file association. The relationship between files and PDUs is based on network entities and timestamps.

At block 305, the trainer retrieves sample PDUs from the network traffic data corresponding to the file. If not already associated, the trainer may correlate by shared network entity attribute. For instance, metadata for the file can specify a network address of a device on which the file was loaded or detected. The trainer can then retrieve sample PDUs with a destination field indicating the network address or a domain name field indicating a domain that resolves to the network address.

At block 307, the trainer groups sample PDUs within a defined time window by shared network entity attributes. Assuming a defined time window of 5 minutes and the training data encompasses network traffic data from a time $t_{start}$ to a time $t_{end}$ (i.e., $t_{end}-t_{start}$=5 minutes), the trainer begins scanning from $t_{start}$ to a $t_{end}$ to group together PDUs in a sliding 5 minute time window that have a common destination network address or common domain depending on the protocol of the PDUs. For instance, TCP packets and UDP datagrams having a common destination network address within the 5 minute window are grouped together. SSL and HTTP messages within the 5 minute time window having a common domain in a request line are grouped together. The SSL and HTTP messages having a common domain that resolves to the destination network address of a group of TCP packets and UDP packets are grouped together as a user session corresponding to the file. The slide/advance rate of the window can be configured based on an expected duration of a user session.

At block 309, the trainer begins processing each grouping of PDU samples. The trainer can iterate over groupings according to temporal order or group size.

At block 311, the trainer begins labeling for each communication protocol represented in the grouping of PDU samples. Each grouping should include PDUs of at least two protocols. If a grouping does not include at least two protocols, then the grouping can be insufficient for training and specified for augmentation with PDUs of other protocols or removed from the training data. The trainer can iterate over the grouping from lowest layer protocol to highest layer protocol.

At block 313, the trainer labels each sample PDU according to network entity based labeling rules for the communication protocol. Below are example labeling rules that use quantity of malicious and benign verdicts or "triggers" that have been reported by cybersecurity tools/services based on network entities, also referred to as network-related artifacts. For HTTP and SSL/TLS messages, the label for the message is based on indications of detected malicious activity for the hostname. The hostname is indicated in a request line of the HTTP message and in the server name indication (SNI) message for a SSL/TLS message.

Label message as Malicious if Malicious $\text{Triggers}_{hostname} \geq 5$.

Label message as Benign if Malicious $\text{Triggers}_{hostname} < 5$.

For PDUs of lower layer protocols, such as TCP packets and UDP datagrams, the triggers indicating malicious activity for source and destination and network addresses are evaluated. The UDP labeling rules also use tagging of UDP datagrams.

Label TCP packet as Malicious if:

$$\text{Malicious Triggers}_{dst\,ip} \geq 5 \text{ OR Malicious Triggers}_{src\,ip} \geq 5.$$

Label TCP packet as Benign if:

$$\text{Malicious Triggers}_{dst\,ip} \geq 5 \text{ OR Malicious Triggers}_{src\,ip} \geq 5.$$

Label UDP datagram as Malicious if:

$$(\text{Malicious Triggers}_{dst\,ip} \geq 5 \text{ AND Tags}_{dst\,ip} \supseteq \text{“suspicious-}udp\text{”}) \text{ OR}$$
$$(\text{Malicious Triggers}_{src\,ip} \geq 5 \text{ AND Tags}_{src\,ip} \supseteq \text{“suspicious-}udp\text{”}).$$

Label UDP datagram as Benign if:

$$(\text{Malicious Triggers}_{dst\,ip} < 5 \text{ OR Tags}_{dst\,ip} \not\supseteq \text{“suspicious-}udp\text{”}) \text{ AND}$$
$$(\text{Malicious Triggers}_{src\,ip} < 5 \text{ OR Tags}_{src\,ip} \not\supseteq \text{“suspicious-}udp\text{”}).$$

At block 315, the trainer determines whether there is another communication protocol represented in the grouping. If not, then operational flow proceeds to block 317. If there is another communication protocol represented in the grouping, then operational flow returns to block 311.

At block 317, the trainer labels the sample PDU grouping based on file classification. The classification of the file associated with the sample PDU group is used to label the group which represents a user session corresponding to the file. These labels will be used for training the protocol-specific C2 classifiers.

At block 319, the trainer determines whether there is another grouping of sample PDUs to process. If not, then operational flow proceeds to block 321. If there is another sample PDUs grouping, then operational flow returns to block 309.

At block 321, the trainer determines whether there is another file associated with the training data. If not, then operational flow proceeds to block 323. If there is another file, then operational flow returns to block 303.

At block 323, the trainer trains protocol specific C2 classifiers with labeled sample PDUs. Multiple trainers can train the protocol specific C2 classifiers concurrently. Each of the protocol specific C2 classifiers is trained with the PDU samples of the corresponding communication protocol. Each model learns to distinguish between two classes (malicious and benign) by adjusting its internal parameters through back propagation and gradient descent, for example. The training process aims to minimize a loss function, such as cross-entropy loss:

$$L = -\frac{1}{m}\sum_{i=1}^{m}\sum_{c=1}^{C} y_{ic}\log(\hat{y}_{ic}),$$

where m is the number of training samples, C is the number of classes, $y_{ic}$ is the ground truth label, and $\hat{y}_{ic}$ is the predicted probability for class c. Each model's performance is evaluated using metrics such as TPR (true positive rate), which measures the proportion of correctly identified malicious payloads, and FPR (false positive rate), which measures the proportion of benign payloads incorrectly classified as malicious.

At block 325, the trainer trains the protocol-agnostic C2 classifier based on labeled groupings. FIG. 4 provides example operations for training the protocol-agnostic C2 classifier.

FIG. 4 is a flowchart of example operations for training a protocol-agnostic C2 classifier based on labeled groupings. Once trained, the protocol-agnostic C2 classifier leverages the strengths of the individual protocol-specific C2 detection models (e.g., HTTP C2 classifier, SSL C2 classifier, UDP C2 classifier, TCP C2 classifier). For each PDU within a user session S, the corresponding protocol-specific C2 classifier $M_p$ generates logits $z_p(X) \in \mathbb{R}^C$, representing the confidence of C2 activity for that specific PDU as represented by the vectorized byte-level payload representation X. This ensures isolated decision-making for each protocol-specific PDU while training a classifier with a combination of the outputs of the protocol specific C2 classifiers allows a model to learn subtle patterns across protocols. For instance, a seemingly benign HTTP request might be followed by a suspicious DNS query or a TCP connection to a known malicious IP address. The model will learn to identify these cross-protocol relationships.

At block 401, the trainer begins processing each grouping of sample PDUs. The trainer can select sample PDU groupings across files.

At block 403, the trainer obtains classification predictions from trained protocol-specific classifiers for byte-level representations of payloads of sample PDUs. The trainer delineates the sample PDUs by communication protocol and extracts payloads from each of the sample PDUs. The trainer then generates a byte-level encoding of each payload by encoding each byte as a numerical value according to an encoding scheme, such as American Standard Code for Information Interchange (ASCII) or Unicode Transformation Format (UTF)-8. Representing or expressing a payload with byte-level encoding addresses the evasion and obfuscation techniques employed in C2 attacks that are not addressed by other pre-processing techniques, such as bag-of-words or word embeddings. For instance, higher-level linguistic features are less effective than a byte-level numerical representation when a payload is encrypted. By operating at the byte level, the model can capture subtle patterns and anomalies that might be indicative of malicious activity, even when the payload has been deliberately obscured. This granular approach allows the model to discern intricate relationships and dependencies between bytes that might otherwise be lost in higher-level representations, thus enhancing its ability to detect C2 attacks, even those employing sophisticated evasion techniques. The trainer vectorizes each byte-level payload encoding. For each vectorized byte-level payload encoding or byte-level payload representation, the trainer invokes the protocol specific C2 classifier corresponding to the communication protocol of the PDU.

At block 411, the trainer combines each vectorized byte-level payload representation with its corresponding logits. The trainer then concatenates the combinations together to form a feature vector representing a cross-protocol user session. The number of vectorized payload and logits combinations that can be input into the protocol-agnostic C2 classifier will be constrained to its structure, particularly to the number of heads of the attention mechanism of the protocol-agnostic C2 classifier. If the quantity of combinations exceeds the capacity of the input layer of the protocol-agnostic C2 classifier, then the trainer truncates the feature vector by removing a sufficient number of payload and logits combinations. Selecting combinations for removal can be based on protocol representation. For example, the combinations of payloads and logits will be reduced for the communication protocol most represented in the user session. If any are removed, these can be designated as alternatives if the eventual predicted classification is uncertain. Another selection scheme can round robin based to reduce each represented communication protocol by 1 unless it would eliminate a protocol from representation.

At block 413, the trainer labels the feature vector representing the user session with the classification of the file corresponding to the grouping for use in training. For instance, the trainer can include the label of the corresponding file in the arguments passed to a training function call. The trainer invokes a training function of the protocol-agnostic C2 classifier, for example a training function of a CNN, to adjust the model accordingly. The model learns to identify spatial patterns and features that are indicative of C2 activity. Mathematically, the convolutional layer output can be expressed as:

$$F^{(l+1)} = \sigma\left(W^{(l)} * F^{(l)} + b^{(l)}\right),$$

where $F^{(1)}$ is the input feature map at layer 1, $W^{(1)}$ represents the convolutional filters at layer 1, * denotes the convolution operation, $b^{(1)}$ is the bias term at layer 1, and $\sigma$ is the activation function (e.g., ReLU (rectified linear unit)). The final layers of the CNN typically include fully connected layers and a SoftMax output layer for classification:

$$\hat{y} = \mathit{Soft}\mathrm{Max}(W_o F + b_o),$$

where $W_o$ and $b_o$ are the weights and biases for the output layer. Operational flow proceeds to block 417 from block 413.

At block 417, the trainer determines whether there is another sample PDU grouping to process. If there is another sample PDU grouping to process, then operational flow returns to block 401. Otherwise, operational flow ends for FIG. 4.

FIG. 5 is a flowchart of example operations for analyzing network traffic data to detect a C2 attack. A user session level C2 classifier will have been trained and deployed as a service, for example. The C2 classification service has access to read a repository of network traffic data that is being updated continuously as network traffic traverse data collection points. Many of the detection operations will be similar to operations performed when training the C2 classifier. The description of FIG. 5 will attempt to reduce repetition.

At block 501, a user session level C2 detection system correlates PDUs in a time window of network traffic data corresponding to a common network entity across different communication protocols. The user session level C2 detection system can select network traffic flows corresponding to a same destination, either by domain or destination network address. The user session level C2 detection system also selects the network traffic flows based on overlapping durations of the flows. The user session level C2 detection system can then select, within each of the flows, pairs of PDUs in a same time window to perform a pairwise evaluation to determine which PDUs have a common network entity.

At block 503, the user session level C2 detection system generates feature vectors from the payloads. The user session level C2 detection system extracts payloads of correlated PDUs, generates byte-level encodings of the payloads, and vectorizes the byte-level payload encodings.

At block 507, the user session level C2 detection system, for each communication protocol represented in the correlated PDUs, invokes a protocol-specific C2 classifier on each vectorized byte-level payload representation corresponding to the protocol. Implementations can invoke the protocol-specific C2 classifiers in parallel.

At block 509, the user session level C2 detection system begins processing each protocol-specific classification. Although presented as serial operations, the classifications per protocol can be processed concurrently.

At block 511, the user session level C2 detection system determines whether a payload is suspicious based on the classification. A suspicious payload is a payload that has been classified as malicious or has been classified with low probability as benign. A payload is considered suspicious if it is:

- predicted as malicious by the protocol-specific C2 classifier, or
- predicted as benign but with a confidence score below a certain threshold $\tau$ (e.g., 0.7).

If a payload is not suspicious, then operational flow proceeds to block 513. Otherwise, operational flow proceeds to block 515.

At block 513, the user session level C2 detection system filters out the byte-level representation from further consideration. The benign classification can be set aside for consideration in light of the eventual classification. The suspicious payload criterion is defined with respect to logits from the protocol-specific C2 classifiers.

At block 515, the user session level C2 detection system forms a feature vector with a combination of the vectorized byte-level payload representation and corresponding logits. Assuming a n length vector for the vectorized byte-level payload representation and a m length vector for the logits, the values would be written into a n+m length vector.

At block 517, the user session level C2 detection system determines whether there is another protocol-specific C2 classification to process. If so, then operational flow returns to block 509. Otherwise, operational flow proceeds to block 518.

At block 518, the user session level C2 detection system determines whether any of the payloads were determined to be suspicious. If none of the payloads were determined to be suspicious, then all of the payloads were classified as benign with a confidence above the suspicious threshold. In that case, all of the payloads would have been filtered out and no feature vector formed. If none of the payloads were determined to be suspicious, then operational flow proceeds to block 525. Otherwise, operational flow proceeds to block 519.

At block 519, the user session level C2 detection system concatenates feature vectors to form a feature vector representing a cross-protocol user session. As stated in the training description, reduction of the combinations may be performed.

At block 521, the user session level C2 detection system invokes a user session level C2 classifier on the concatenated feature vectors. For instance, a CNN function call is made that includes the feature vector as an argument and identifier of the trained user session level C2 classifier.

At block 523, the user session level C2 detection system indicates a verdict based on classification obtained from invoking the user session level C2 classifier on the concatenated feature vectors. If the classification is benign, then the system indicates no action to be taken, for example. If the classification is malicious, then the system generates a verdict that a C2 attack has been detected.

At block 525, the user session level C2 detector indicates a benign verdict for the user session. In this case, the verdict is determined without invoking the protocol-agnostic C2 classifier since none of the payloads were suspicious and no fused feature vector was created.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations that involve training and/or invocation of the protocol-specific C2 classifiers can be performed in parallel. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, which employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
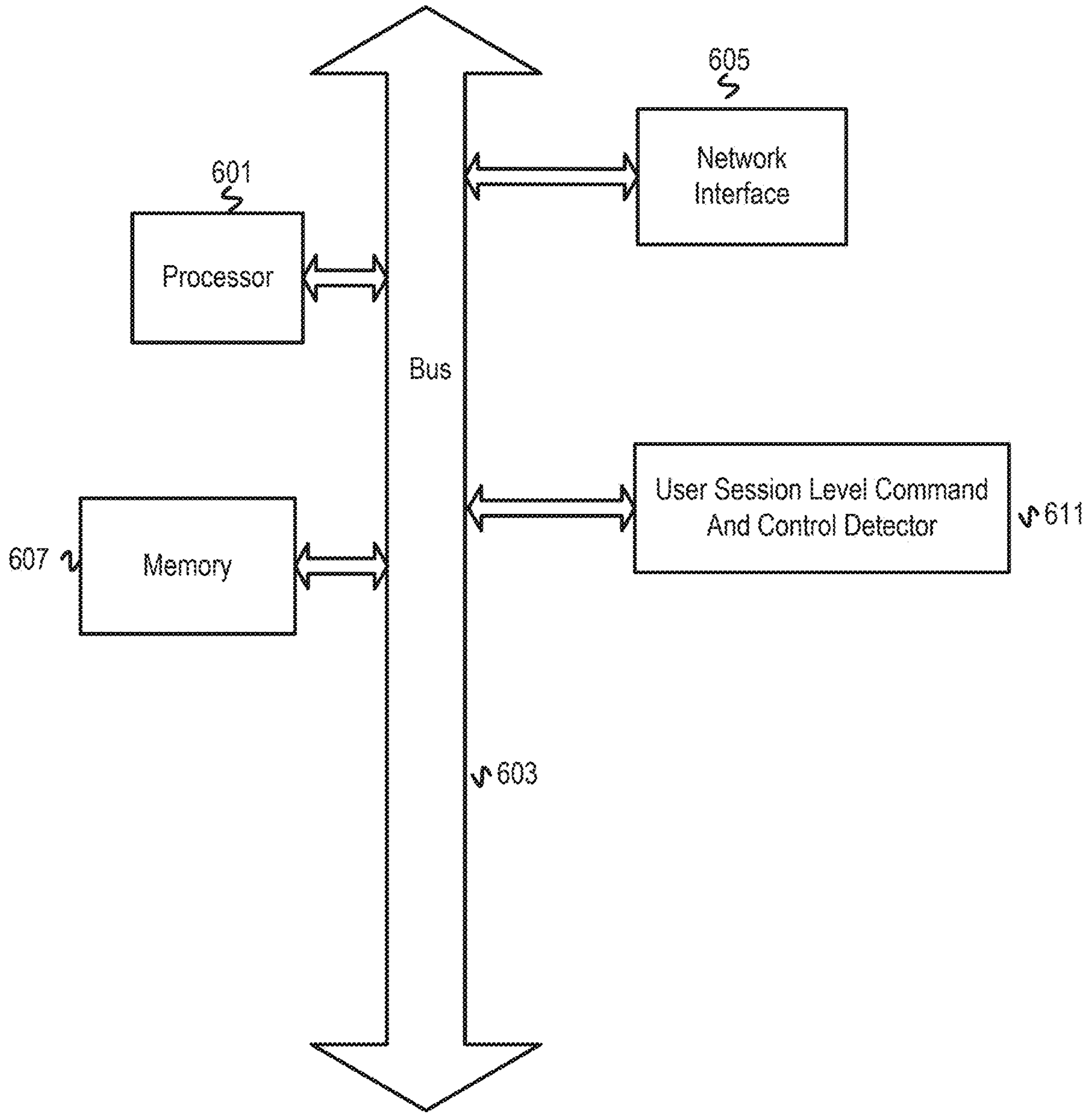
FIG. 6 depicts an example computer system with a user session level C2 detector.

FIG. 6 depicts an example computer system with a user session level C2 detector. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes user session level C2 detector 611. The user session level C2 detector 611 is a fused model that has been trained to detect C2 activity at a user session level based on features and classifications of constituent cross-protocol PDU payloads constituent to a user session. The fused model includes trained protocol-specific classifiers that classify individual PDUs by specific protocol as malicious or benign relative to C2 activity based on byte-level representations of the individual PDU payloads. For PDUs that are suspicious based on the logits from the protocol-specific C2 classifiers, the input feature vectors and logits are combined and these are fused together into a feature vector to be input to a protocol-agnostic C2 classifier of the user session level C2 detector. This input to the protocol-agnostic C2 classifier provides a cross-protocol user session level representation informed by the protocol-specific classifications. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

The invention claimed is:

1. A method comprising:

for each of a plurality of protocol data units correlated by common network entity, generating a byte-level representation of a payload of the protocol data unit;

for each byte-level representation, invoking one of a plurality of protocol-specific command and control (C2) classifiers that corresponds to the byte-level representation;

identifying suspicious ones of the plurality of protocol data units based, at least in part, on confidence of classifications from the plurality of protocol-specific C2 classifiers;

for each suspicious protocol data unit, combining the byte-level payload representation and logits corresponding to classification of the byte-level payload representation;

forming a feature vector with the combined byte-level representations and logits; and invoking a protocol-agnostic C2 classifier on the formed feature vector to generate a malicious or benign classification.

2. The method of claim 1 further comprising indicating a benign classification if none of the protocol-specific classifications is a malicious classification and none of the classifications is a benign classification with low confidence.

3. The method of claim 1, wherein identifying suspicious ones of the plurality of protocol data units comprises identifying as suspicious those of the protocol data units corresponding to a byte-level representation classified as malicious and those of the protocol data units corresponding to a byte-level representation classified as benign with low confidence based on the logits.

4. The method of claim 1, wherein the plurality of protocol-specific C2 classifiers comprises a classifier for Hypertext Transfer Protocol (HTTP) messages, a classifier for Secure Sockets Layer (SSL) messages, a classifier for Transmission Control Protocol (TCP) packets, and a classifier for User Datagram Protocol (UDP) datagrams.

5. The method of claim 1, wherein the protocol-agnostic C2 classifier comprises a convolutional neural network with a multi-headed self-attention mechanism.

6. The method of claim 1 further comprising correlating the plurality of protocol data units based on the network entity being common across the protocol data units within a defined time window.

7. The method of claim 6, wherein correlating the plurality of protocol data units comprises:

selecting a second plurality of protocol data units within the defined time window, wherein the second plurality of protocol data units is a superset of the plurality of protocol data units; and pairwise evaluating protocol data units of the second plurality to determine whether a pair of protocol data units has a domain name in common or a destination network address in common and assigning the pair of protocol data units to a same group accordingly.

8. A non-transitory, machine-readable medium having program code stored thereon, the program code comprising instructions to:

train each of a plurality of protocol-specific command and control (C2) classifiers on a first training dataset to classify a byte-level encoding of a payload of a traffic sample of a corresponding communication protocol as malicious or benign, wherein the training dataset includes traffic samples of different communication protocols across multiple user level sessions already indicated as malicious or benign;

train a C2 classifier on a second training dataset that includes traffic samples of different communication protocols across multiple user sessions already indicated as malicious or benign, wherein the instructions to train the C2 classifier comprise instructions to, for each of the multiple user sessions in the second training dataset, generate a session-level representation of the user session with vectorized byte-encodings of payloads of traffic samples of the user session and corresponding logits generated by the trained plurality of protocol-specific classifiers based on the vectorized byte-encodings of payloads of traffic samples of the user session;

label the session-level representation according to whether the session is malicious or benign;

invoke the C2 classifier on the session-level representation, wherein the C2 classifier comprises a multi-headed self-attention mechanism; and update the C2 classifier weights based on loss evaluation with respect to the session label.

9. The non-transitory, machine-readable medium of claim 8, wherein the program code further comprises instructions to encode each payload at byte-level according to an encoding scheme to generate each byte-level encoding.

10. The non-transitory, machine-readable medium of claim 8, wherein a session label is a classification of a file corresponding to a user session.

11. The non-transitory, machine-readable medium of claim 8, wherein the program code further comprises instructions to correlate traffic samples of the second training dataset to a corresponding session based on shared attributes within a defined time window.

12. The non-transitory, machine-readable medium of claim 8, wherein the plurality of protocol-specific classifiers comprises at least two of a classifier for Hypertext Transfer Protocol (HTTP) messages, a classifier for Secure Sockets Layer (SSL) messages, a classifier for Transmission Control Protocol (TCP) packets, and User Datagram Protocol (UDP) datagrams.

13. An apparatus comprising:

a processor; and a machine-readable medium having stored thereon instructions executable by the processor to cause the apparatus to, for each of a plurality of protocol data units determined as corresponding to a first session, generate a byte-level representation of a payload of the protocol data unit;

for each byte-level representation, select one of a plurality of protocol-specific classifiers based on a communication protocol of the corresponding packet and invoke the selected protocol-specific classifier to classify the byte-level representation as benign or malicious;

identify suspicious ones of the plurality of protocol data units based on the classifications;

for each suspicious protocol data unit, combine the byte-level representation and a logit corresponding to the classification of the byte-level representation;

generate a representation of the first session with the combined byte-level representations and logits; and invoke a neural-network based classifier on the first session representation to generate a malicious or benign classification for the first session.

14. The apparatus of claim 13, wherein the machine-readable medium further has stored thereon instructions executable by the processor to cause the apparatus to classify the first session as benign if none of the classifications is a malicious classification and none of the classifications is a benign classification with a probability that satisfies a suspicious criterion.

15. The apparatus of claim 13, wherein the instructions to identify suspicious ones of the plurality of protocol data units comprise instructions executable by the processor to cause the apparatus to identify as suspicious those of the protocol data units corresponding to a byte-level representation classified as malicious and those of the protocol data units corresponding to a byte-level representation classified as benign with low confidence based on the logits.

16. The apparatus of claim 13, wherein the plurality of protocol-specific classifiers comprises a classifier for Hypertext Transfer Protocol (HTTP) messages, a classifier for Secure Sockets Layer (SSL) messages, a classifier for Transmission Control Protocol (TCP) packets, and a classifier for User Datagram Protocol (UDP) datagrams.

17. The apparatus of claim 13, wherein the neural network based classifier comprises a convolutional neural network with a multi-headed self-attention mechanism.

18. The apparatus of claim 13, wherein the machine-readable medium further has stored thereon instructions executable by the processor to cause the apparatus to determine the plurality of protocol data units as corresponding to the first session based on shared attributes within a defined time window.

19. The apparatus of claim 13, wherein the instructions to determine the plurality of protocol data units as corresponding to the first session comprise instructions executable by the processor to cause the apparatus to:

select a second plurality of protocol data units within the defined time window; and pairwise evaluate protocol data units of the second plurality to determine whether a pair of protocol data units shares a network entity and assign the pair of protocol data units to a same session if they share a network entity.

20. The apparatus of claim 13, wherein the instructions to generate a byte-level representation of a payload comprise instructions executable by the processor to cause the apparatus to encode the payload at byte level and vectorize the byte-level encoding.

* * * * *